Patented Aug. 22, 1950

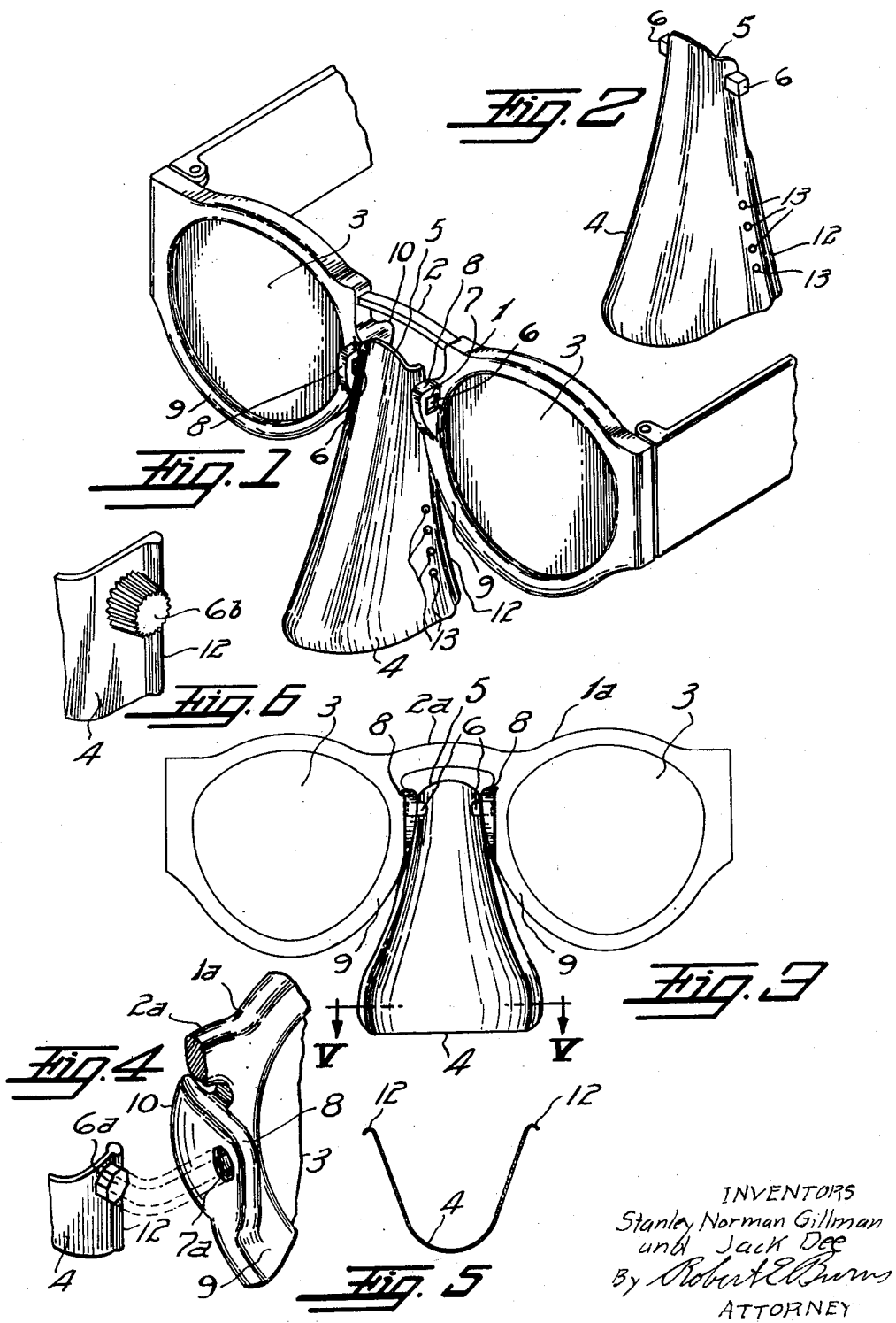

2,519,561

UNITED STATES PATENT OFFICE 2,519,561

NOSE SHIELD FOR SPECTACLES, SUNGLASSES, OR THE LIKE

Stanley Norman Gillman, Primrose, Transvaal, and Jack Dee, Berea, Johannesburg, Transvaal, Union of South Africa Application October 30, 1946, Serial No. 706,710 In Great Britain May 15, 1946

4 Claims. (Cl. 2—206)

1

This invention relates to improvements in spectacles, sun glasses and the like whereby these devices are provided with means for protecting the wearer's nose against sunburn.

According to the invention broadly a pair of spectacles, sun glasses or the like, hereinafter referred to as glasses, are provided with a suitably shaped nose shield which is so attached or attachable thereto that when said glasses are worn in the normal manner, the said shield is adapted to extend downwardly over the nose so as to protect it either partly or wholly against the sun's rays.

The said nose shield is arranged to fit neatly the shape of the nose and is preferably of natural skin colour so as to be as inconspicuous as possible. It may be of opaque material or material which is translucent so that the strength of the rays which impinge upon the nose are reduced and severe sunburn is prevented, although normal sunburn is allowed to take place.

According to one form which the invention may take, the nose shield is permanently secured to the lenses of the glasses or to the frame in which they are supported. Preferably however the shield is detachably securable to the lenses of the glasses or to the frame thereof so that it need only be worn when required. To achieve this purpose the top end of the nose shield is provided with fastening elements which are adapted to engage with co-acting complementary fastening elements or the equivalent provided on or in the lenses of the glasses or on or in the frame thereof.

In one form of construction the said elements on the top end of the nose shield consist of a pair of projections, one on either side thereof, which are adapted to fit into correspondingly shaped apertures or recesses provided in the usual small supporting flanges of the frame which normally rest on each side of the upper portion of the nose of the wearer, or in forwardly directed lug-like extensions thereof. These projections are conveniently arranged to be inserted in their engaging positions either by making the bridge piece of the frame of the glasses resilient or resiliently extensible, or by making the top end of the nose shield resilient so that it may be contracted sufficiently by pressure between a finger and thumb to enable the said projections to be sprung into position with respect to the said apertures or recesses in the aforesaid supporting flanges of the frame.

To retain the nose shield at the correct angle with respect to the glasses, the projections and their coacting apertures or recesses, are of non-circular shape, such as square, triangular, or hexagonal. By making said projections and their corresponding apertures or recesses of regular polygonal shape, means are provided for adjusting the angle of slope of the nose shield with respect to the glasses to suit the requirements of the wearer.

The bridge piece of the frame of the glasses may be made resiliently extensible by incorporating a coiled spring therein, or constructing it of a coiled spring. Alternatively said bridge piece may be made of solid spring material so that the two glass supporting portions of the frame may be opened upwardly away from one another to enable the nose shield to be inserted in position therebetween.

The nose shield is preferably made of a light opaque material such as Celluloid or other suitable synthetic material, although as previously stated, it may be made of material which will allow a certain proportion of the sun's rays to pass through it so that normal tanning of the skin of the nose will take place without causing discomfort. In other words the material used may act as a filter for the more harmful rays of the sun.

In order that the invention may be more clearly understood and carried into practice, reference is now made to the accompanying drawings in which like reference numerals refer to like parts throughout the several views.

In the drawings:

Fig. 1 is an incomplete isometric view of a pair of sun glasses, arranged and fitted with a nose shield according to the present invention;

Fig. 2 is an isometric view of the nose shield shown in Fig. 1;

Fig. 3 is a front view of a modified form of construction of a pair of sun glasses fitted with a nose shield;

Fig. 4 is a fragmentary isometric view of an alternative method of connecting the nose shield to the frame of a pair of sun glasses;

Fig. 5 is a horizontal cross-sectional view taken on line V—V of Fig. 3; and

Fig. 6 is a fragmentary isometric view of one side of the top end of the nose shield showing a further modified form of projection for engaging in a correspondingly shaped co-acting aperture provided on the frame of the sun glasses.

Referring to the drawings, the sun glasses 1, illustrated in Fig. 1, comprise two lens frames which are connected by a resilient bridge-piece 2, consisting of a spring steel or like element whereby the nose space between the two lens frames 9 supporting lenses 3 may be increased by an upward bending movement for engaging or disengaging the nose shield 4. The nose shield 4, which is of substantially widened V-shape tapering from a larger cross-section at the bottom end towards a narrower cross-section at the top end to correspond substantially with the shape of a nose, is provided adjacent its upper narrow end 5 with a pair of outwardly and oppositely extending trunnion-like projections 6, which are of square cross-sectional shape and are adapted to engage in similarly shaped apertures 6 provided in forwardly directed lug-like extensions 8 formed integrally with the lens frames 9, which extensions 8 are conveniently adapted to form forwardly projecting extensions of the usual supporting flanges 10 which normally rest one on each side of the upper portion of the nose of the wearer.

The substantially vertical rear edges of the nose shield 4 which are nearest to the wearer's face, are rounded, beaded or similarly curved as denoted by reference numeral 12, so that involuntary or sudden movement will not cause injury to the wearer's face. A plurality of ventilation holes 13 may be provided if desired in the nose shield adjacent to the rear edge to permit free circulation of air.

The provision of a resilient bridge-piece 2 is particularly necessary in cases where the nose shield 4 is manufactured from a non-resilient or rigid material. If the nose shield is manufactured from a resilient material, which is preferable, the sun glasses may be of the usual kind having a rigid bridge-piece 2a as illustrated in Figs. 3 and 4. The sun glasses 1a shown in Fig. 3 are also provided with outwardly directed lug-like extensions 8 in which the projections 6 of the nose shield 4 are adapted to engage.

To allow adjustment of the angle at which the nose shield 4 is located with respect to the sun glasses 1 or 1a, the projections 6 and the co-acting apertures 7 in the lug-like projections 8 of the sun glasses, are of co-acting polygonal cross-sectional shape. As shown in Fig. 4, the nose shield projection 6a and the co-acting aperture 7a are of octagonal shape. As adjustment is very limited in the cases of regular octagonal or regular polygonal shape, a larger degree of adjustment is readily obtained by providing the nose shield with serrated frusto-conically shaped projections 6b as shown in Fig. 6, for engagement in similarly shaped apertures provided in the lug-like projections 8 of the sun glasses.

By means of this construction adjustment of the nose shield may be readily obtained by applying slight contracting pressure by a finger and thumb to the upper portion of the nose shield, moving it to the desired angular position, and then releasing said pressure.

The nose shield 4 illustrated in Fig. 1 is readily removable by bending the lens frames 9 upwardly towards one another against the action of the resilient bridgepiece 2, whereby the space between the outwardly extending lug-like projections 8 is increased sufficiently to disengage the projections 6 from their co-acting apertures 7. In the case of the sun glasses 1a of Fig. 3, the nose shield 4 is readily removed by applying pressure by means of a finger and thumb to the upper portion thereof so as to contract it sufficiently to permit disengagement of the projections 6, from the holes 7 in the extensions 8.

What we claim is:

1. In a pair of glasses, means for supporting the glasses having opposite sides adapted to bear upon opposite sides of the nose of the wearer, each of said sides having an aperture of regular rectilinearly-sided outline, a nose shield, and a trunnion-like projection on each side of said nose shield, said projections being complementary in form to said apertures and being engageable respectively therein.

2. In a pair of glasses, means for supporting the glasses having opposite sides adapted to bear upon opposite sides of the nose of the wearer, each of said sides having an aperture of regular polygonal outline, a nose shield, and a trunnion-like projection on each side of said nose shield, said projections being complementary in form to said apertures and being engageable respectively therein.

3. In a pair of glasses, means for supporting the glasses having opposite sides adapted to bear upon opposite sides of the nose of the wearer, each of said sides having a serrated frusto-conical aperture, a nose shield, and a trunnion-like projection on each side of said nose shield, said projections being complementary in form to said apertures and being engageable respectively therein.

4. In a pair of glasses, means for supporting the glasses having opposite sides adapted to bear upon opposite sides of the nose of the wearer, each of said sides having an aperture of regular rectilinearly-sided outline, a flexible nose shield, and a trunnion-like projection on each side of said nose shield, said projections being complementary in form to said apertures and being engageable respectively therein.

STANLEY NORMAN GILLMAN.
JACK DEE.

REFERENCES CITED

The following references are of record in the file of this patent:

UNITED STATES PATENTS

| Number | Name | Date |
| --- | --- | --- |
| 803,975 | Bick | Nov. 7, 1905 |
| 825,170 | Allen | July 3, 1906 |
| 2,037,772 | Everett et al. | Apr. 21, 1936 |
| 2,197,973 | Everett et al. | Apr. 23, 1940 |
| 2,233,698 | Girouard | Mar. 4, 1941 |

FOREIGN PATENTS

| Number | Country | Date |
| --- | --- | --- |
| 613,934 | France | Sept. 6, 1926 |